(12) United States Patent
Herndon et al.

(10) Patent No.: US 9,099,903 B2
(45) Date of Patent: Aug. 4, 2015

(54) STATOR ASSEMBLY SUPPORT

(71) Applicant: Seagate Technology LLC, Cupertino, CA (US)

(72) Inventors: Troy M. Herndon, San Jose, CA (US); Hans Leuthold, Santa Cruz, CA (US); Lynn B. Le, San Jose, CA (US); Chris Woldemar, Santa Cruz, CA (US); Matthew M. McConnell, Scotts Valley, CA (US); Paco G. Flores, Felton, CA (US)

(73) Assignee: Seagate Technology LLC, Cupertino, CA (US)

( * ) Notice: Subject to any disclaimer, the term of this patent is extended or adjusted under 35 U.S.C. 154(b) by 128 days.

(21) Appl. No.: 13/789,461

(22) Filed: Mar. 7, 2013

(65) Prior Publication Data

US 2013/0241323 A1    Sep. 19, 2013

Related U.S. Application Data

(60) Provisional application No. 61/610,782, filed on Mar. 14, 2012.

(51) Int. Cl.
*H02K 5/24* (2006.01)
*H02K 5/22* (2006.01)
*H02K 1/18* (2006.01)

(52) U.S. Cl.
CPC .................. *H02K 5/24* (2013.01); *H02K 1/187* (2013.01); *H02K 5/22* (2013.01)

(58) Field of Classification Search
CPC .................................. H02K 5/25; H02K 5/26
USPC .......... 310/43, 51, 216.01, 216.025, 216.026, 310/216.027, 216.028, 216.029, 216.031, 310/216.033
See application file for complete search history.

(56) References Cited

U.S. PATENT DOCUMENTS

| | | | |
|---|---|---|---|
| 4,965,476 A | 10/1990 | Lin | |
| 5,241,229 A | 8/1993 | Katakura et al. | |
| 5,694,268 A | 12/1997 | Dunfield et al. | |
| 5,986,365 A | 11/1999 | Kuwert et al. | |
| 6,608,734 B1 | 8/2003 | Herndon et al. | |
| 6,804,987 B2 * | 10/2004 | Kloeppel et al. | 73/10 |
| 6,844,636 B2 | 1/2005 | Lieu et al. | |
| 7,378,771 B2 * | 5/2008 | Leblanc et al. | 310/90 |
| 8,181,348 B2 * | 5/2012 | Herndon et al. | 29/898.11 |
| 2005/0006964 A1 * | 1/2005 | Kim | 310/67 R |
| 2005/0134136 A1 * | 6/2005 | Horng et al. | 310/209 |
| 2005/0140220 A1 * | 6/2005 | Tsuda et al. | 310/67 R |
| 2006/0176612 A1 | 8/2006 | Hamaoka | |
| 2007/0013240 A1 * | 1/2007 | Aiello et al. | 310/52 |
| 2007/0133123 A1 * | 6/2007 | Ichizaki | 360/99.05 |
| 2007/0228851 A1 * | 10/2007 | Smirnov et al. | 310/90 |
| 2008/0100171 A1 | 5/2008 | Nakajima et al. | |
| 2010/0195248 A1 | 8/2010 | Yamada et al. | |
| 2010/0253170 A1 | 10/2010 | Bi et al. | |
| 2011/0051287 A1 | 3/2011 | Tokunaga | |
| 2013/0140926 A1 * | 6/2013 | Bailey et al. | 310/71 |
| 2013/0187500 A1 * | 7/2013 | Bailey et al. | 310/91 |

* cited by examiner

*Primary Examiner* — Naishadh Desai

(57) ABSTRACT

Provided herein is an apparatus, having a cylindrical structure extending from a base; a stator assembly having a stator ring and a plurality of stator teeth extending from an outer diameter of the stator ring; and a stator assembly support having a supporting means for supporting at least one of the stator ring or the plurality of stator teeth, wherein the stator assembly support is configured to dampen mechanical vibrations in the base.

17 Claims, 9 Drawing Sheets

STATOR ASSEMBLY SUPPORT

CROSS REFERENCE

This application claims the benefit of U.S. Provisional Patent Application No. 61/610,782, filed Mar. 14, 2012.

BACKGROUND

An electric motor may use stators and magnets or coils to rotate an object. For example, a motor may rotate data storage disks used in a disk drive storage device. The data storage disks may be rotated at high speeds during operation using the stators and magnets or coils. For example, magnets or coils may interact with a stator to cause rotation of the disks relative to the stator.

In some cases, electric motors are manufactured with increasingly reduced sizes. For example, in order to reduce the size of a disk drive storage device, the size of various components of the disk drive storage device may be reduced. Such components may include the electric motor, stator, and magnets or coils.

SUMMARY

Provided herein is an apparatus, having a cylindrical structure extending from a base; a stator assembly having a stator ring and a plurality of stator teeth extending from an outer diameter of the stator ring; and a stator assembly support having a supporting means for supporting at least one of the stator ring or the plurality of stator teeth, wherein the stator assembly support is configured to dampen mechanical vibrations in the base.

These and other aspects and features of the invention may be better understood with reference to the following drawings, description, and appended claims.

DRAWINGS

Figure 1A:
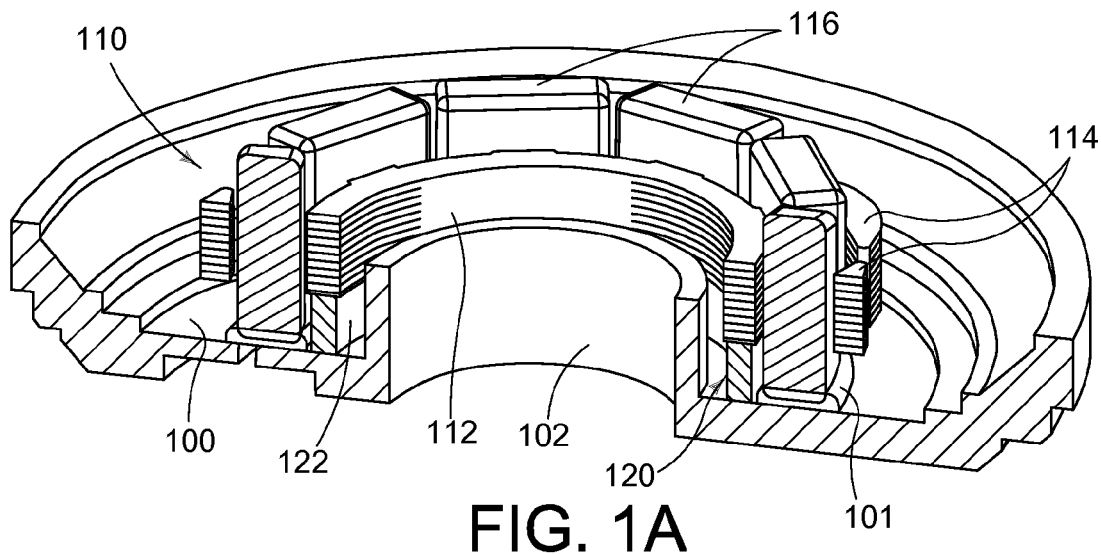

FIG. 1A provides a cross-sectional perspective of a stator assembly and stator assembly support having a stator ring support, according to an embodiment.

Figure 1B:
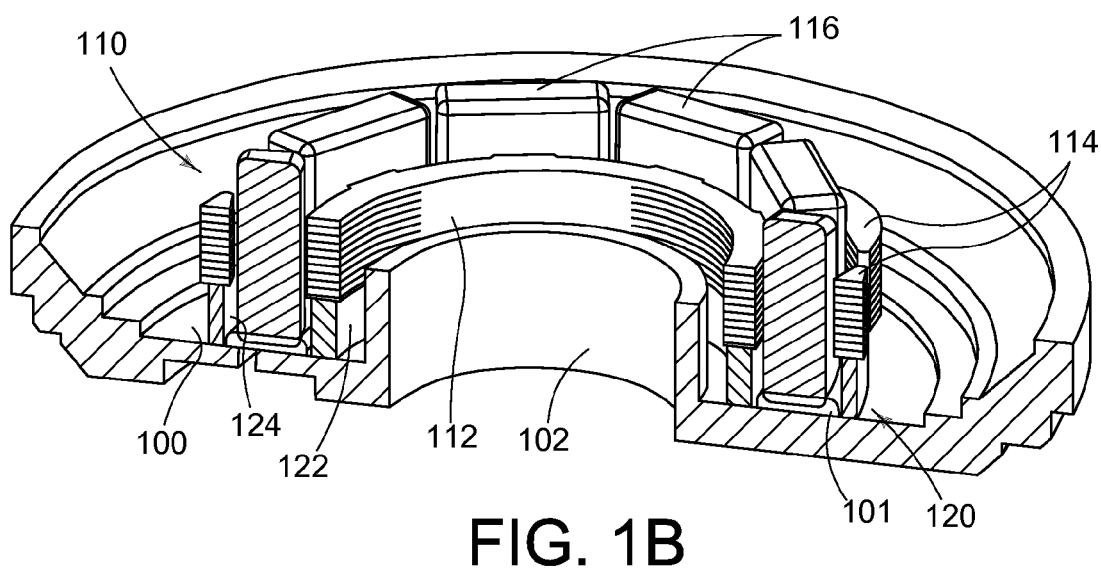

FIG. 1B provides a cross-sectional perspective of a stator assembly and stator assembly support having a stator ring support and a stator teeth support, according to an embodiment.

Figure 1C:
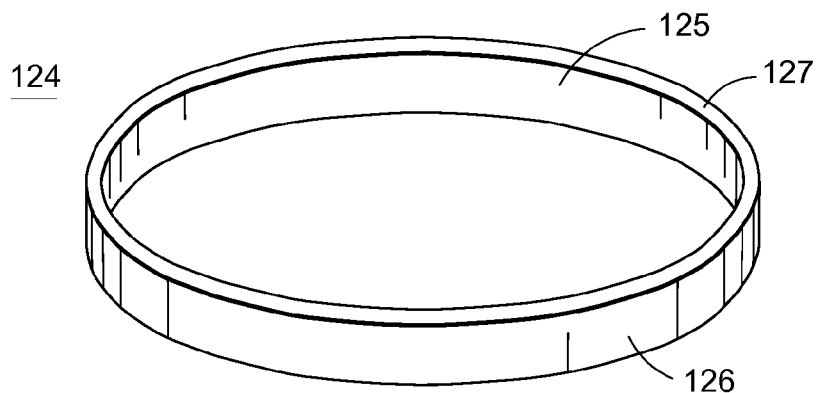

FIG. 1C provides a perspective of a stator teeth support, according to an embodiment.

Figure 2A:
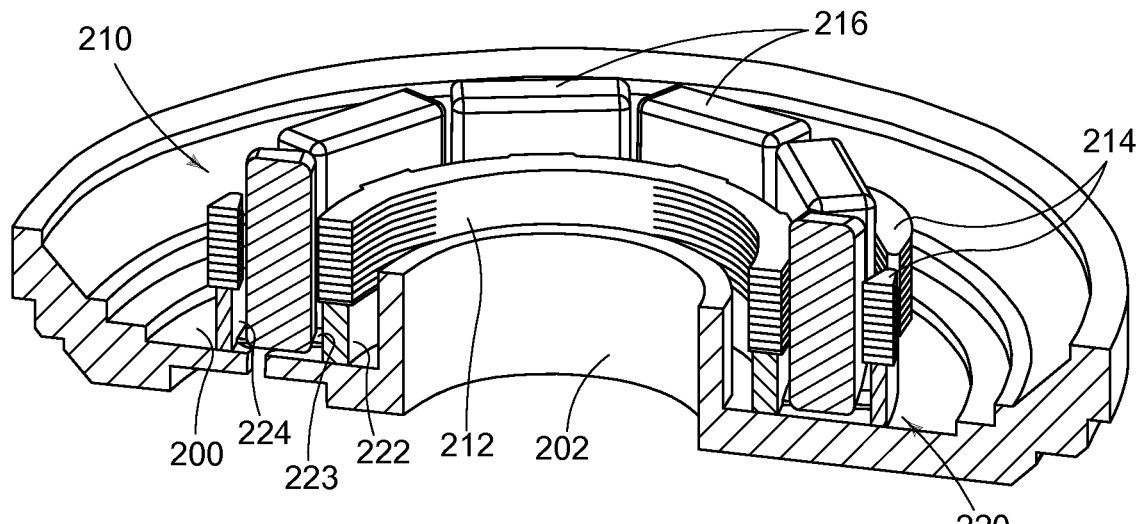

FIG. 2A provides a cross-sectional perspective of a stator assembly and stator assembly support having a stator ring support, a stator teeth support, and ribs, according to an embodiment.

Figure 2B:
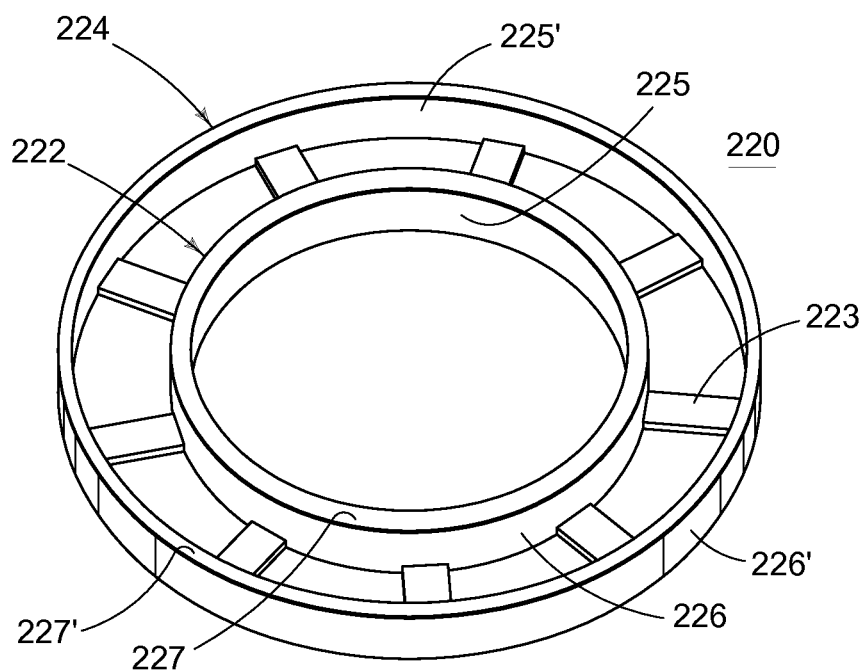

FIG. 2B provides a perspective of a stator assembly support having a stator ring support, a stator teeth support, and ribs, according to an embodiment.

Figure 2C:
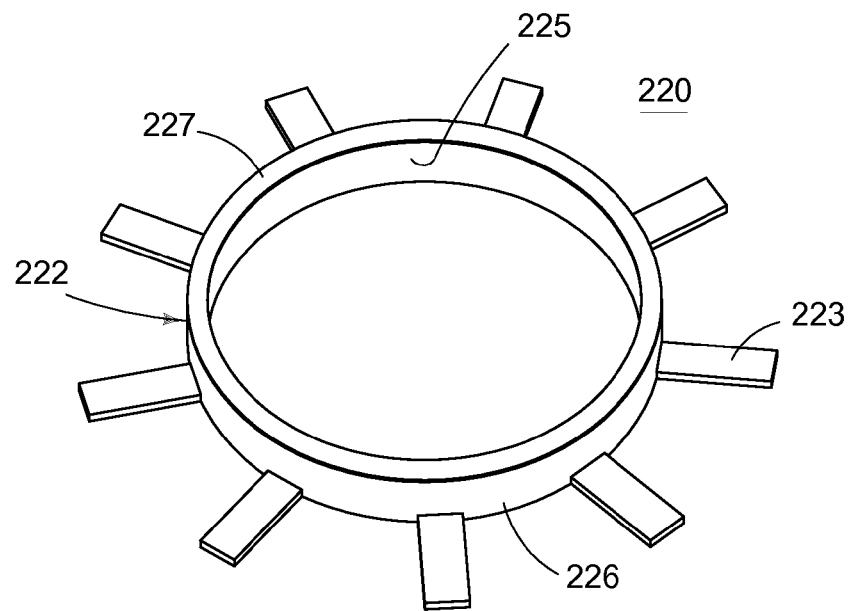

FIG. 2C provides a perspective of a stator assembly support having a stator ring support and ribs, according to an embodiment.

Figure 2D:
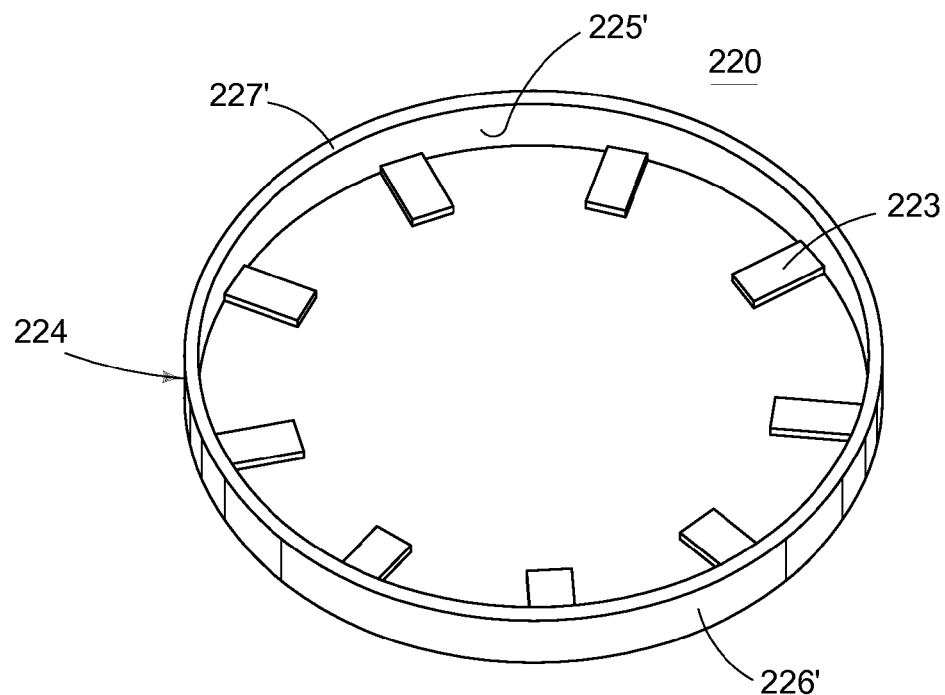

FIG. 2D provides a perspective of a stator assembly support having a stator teeth support and ribs, according to an embodiment.

Figure 3A:
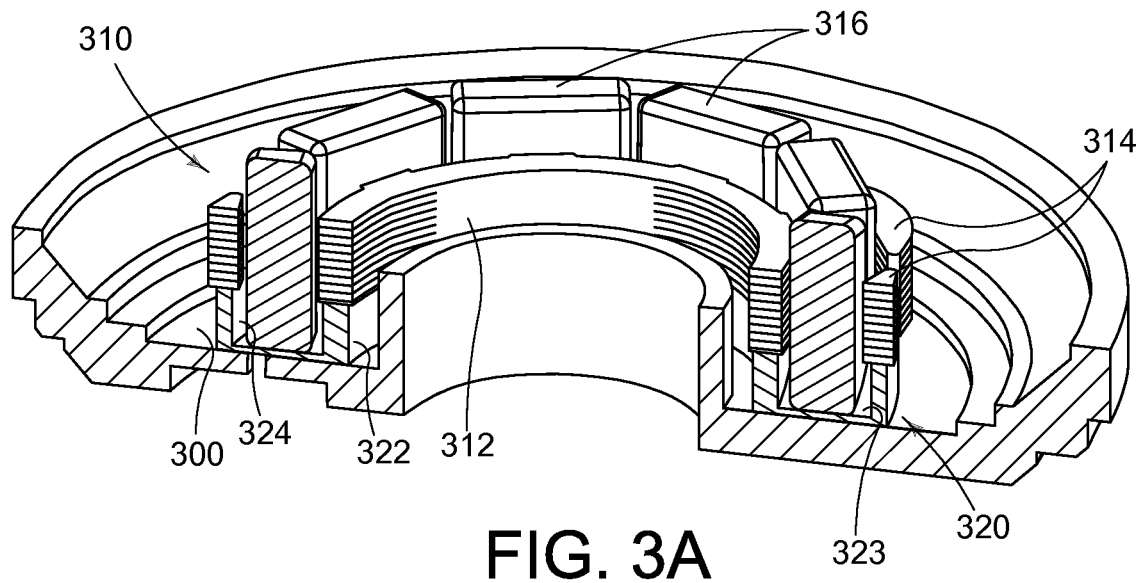

FIG. 3A provides a cross-sectional perspective of a stator assembly and stator assembly support having a stator ring support, a stator teeth support, and a full bottom, according to an embodiment.

Figure 3B:
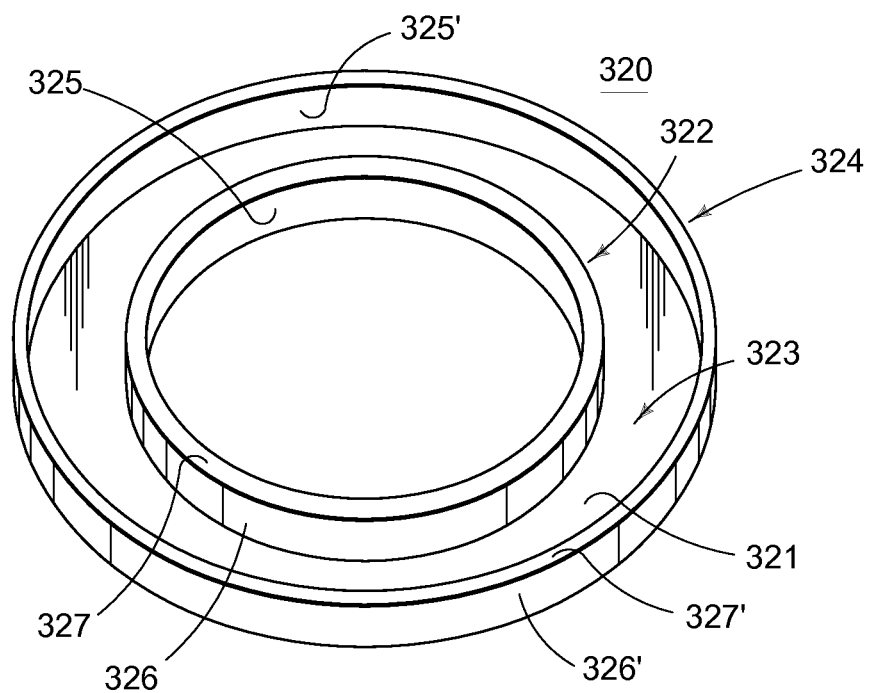

FIG. 3B provides a perspective of a stator assembly support having a stator ring support, a stator teeth support, and a full bottom, according to an embodiment.

Figure 3C:
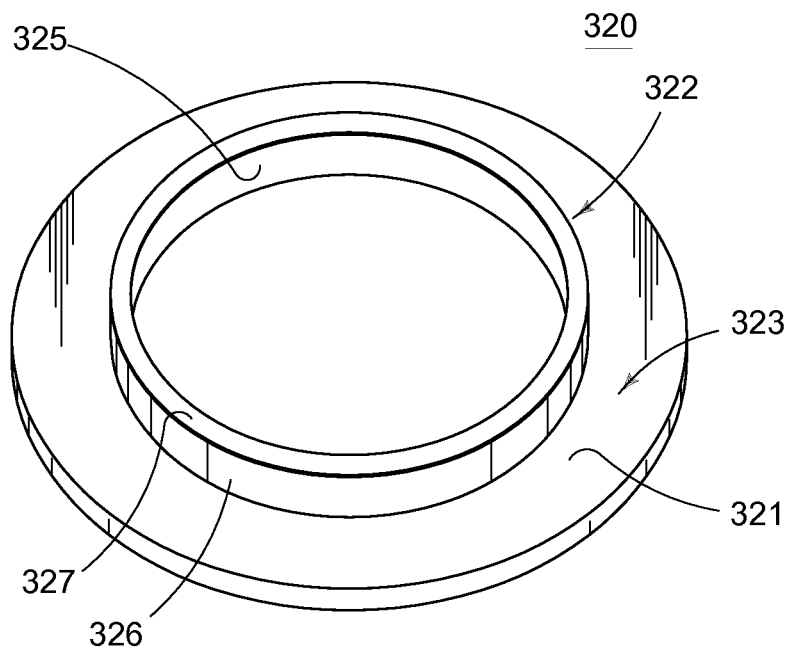

FIG. 3C provides a perspective of a stator assembly support having a stator ring support and a full bottom, according to an embodiment.

Figure 3D:
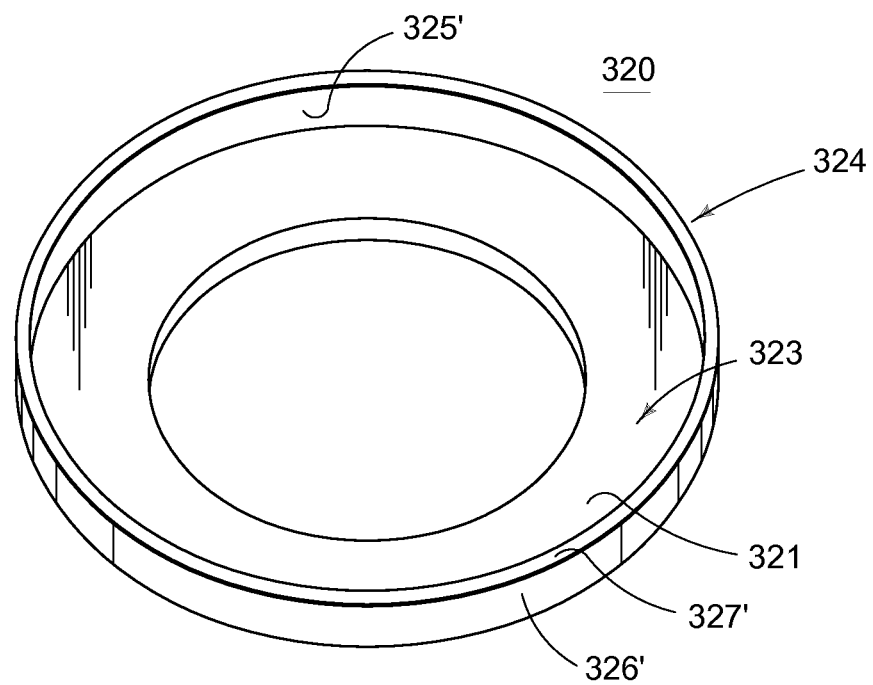

FIG. 3D provides a perspective of a stator assembly support having a stator teeth support and a full bottom, according to an embodiment.

Figure 4A:
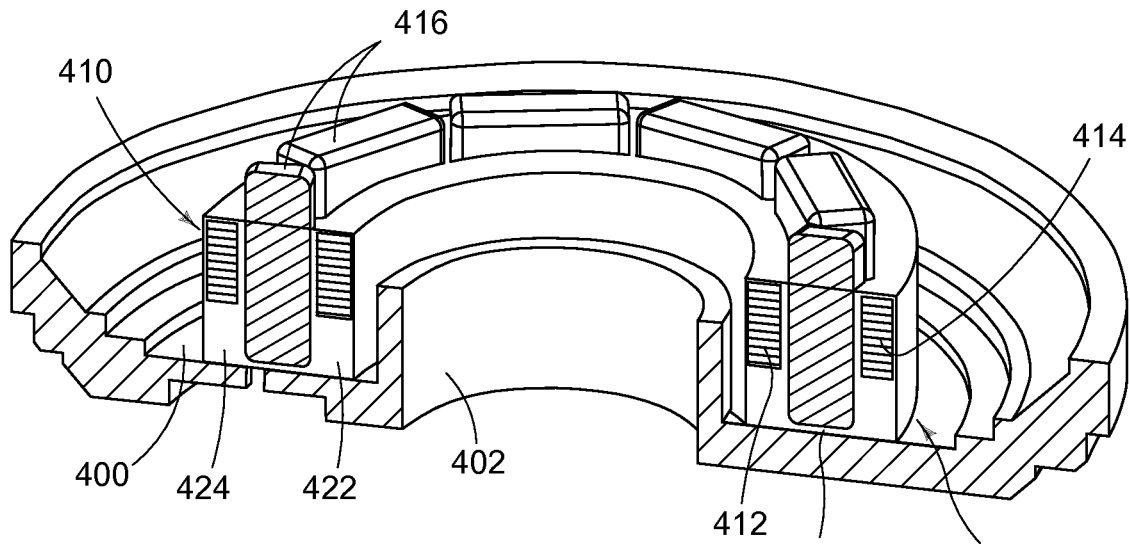

FIG. 4A provides a cross-sectional perspective of a stator assembly and partially molded stator assembly support, according to an embodiment.

Figure 4B:
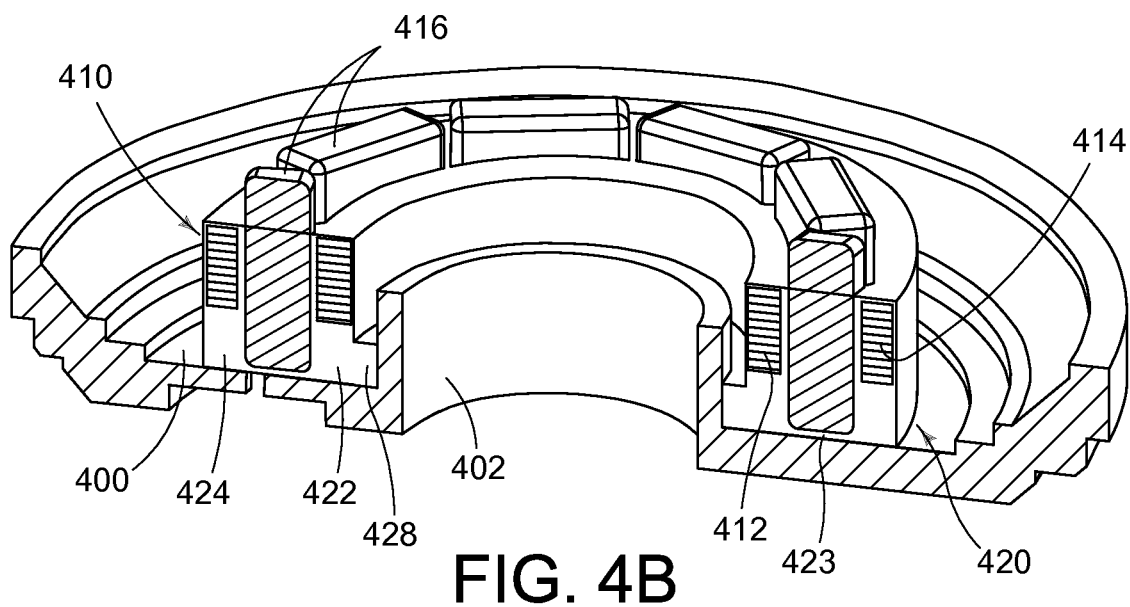

FIG. 4B provides a cross-sectional perspective of a stator assembly and partially molded stator assembly support having a centering feature, according to an embodiment.

Figure 5A:
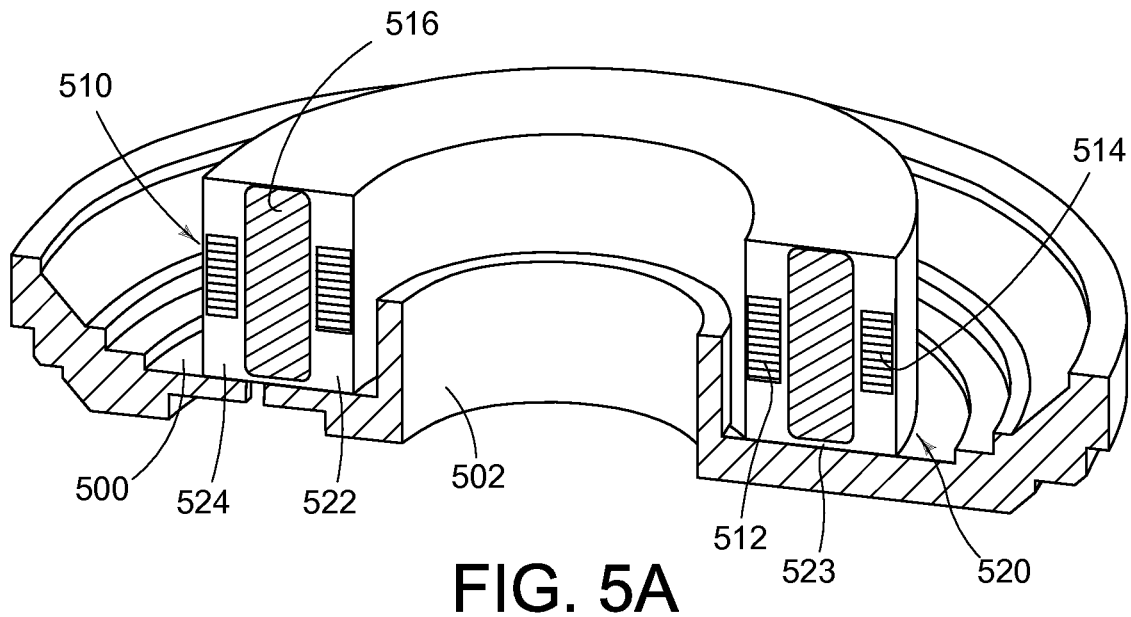

FIG. 5A provides a cross-sectional perspective of a stator assembly and fully molded stator assembly support, according to an embodiment.

Figure 5B:
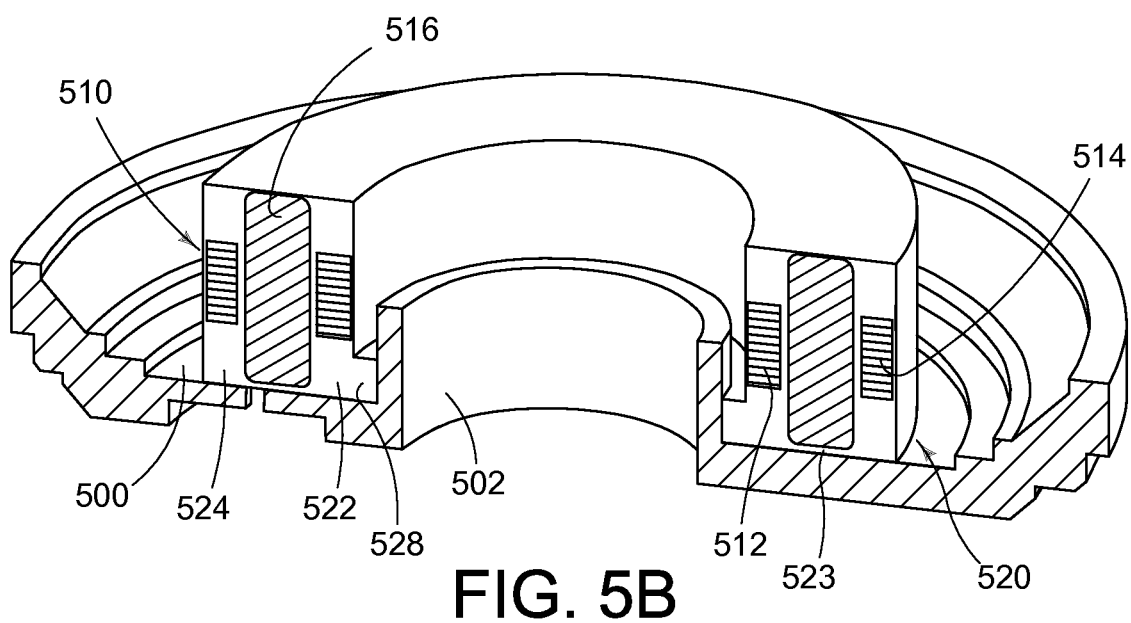

FIG. 5B provides a cross-sectional perspective of a stator assembly and fully molded stator assembly support having a centering feature, according to an embodiment.

Figure 6:
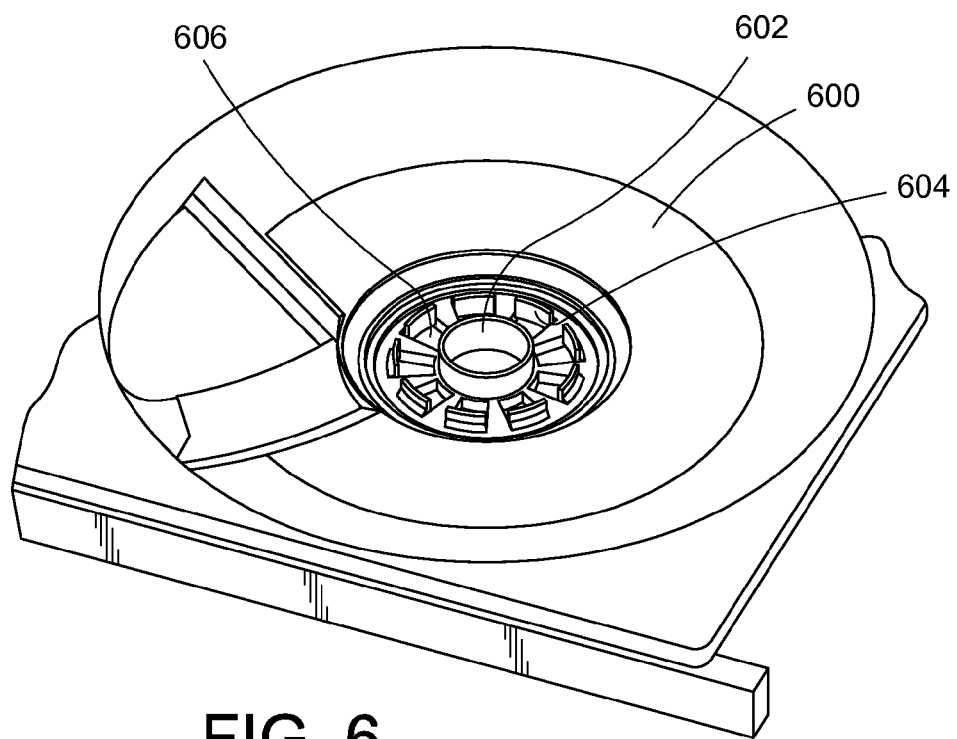

FIG. 6 provides a cross-sectional perspective of a base having tabs, according to an embodiment.

Figure 7:
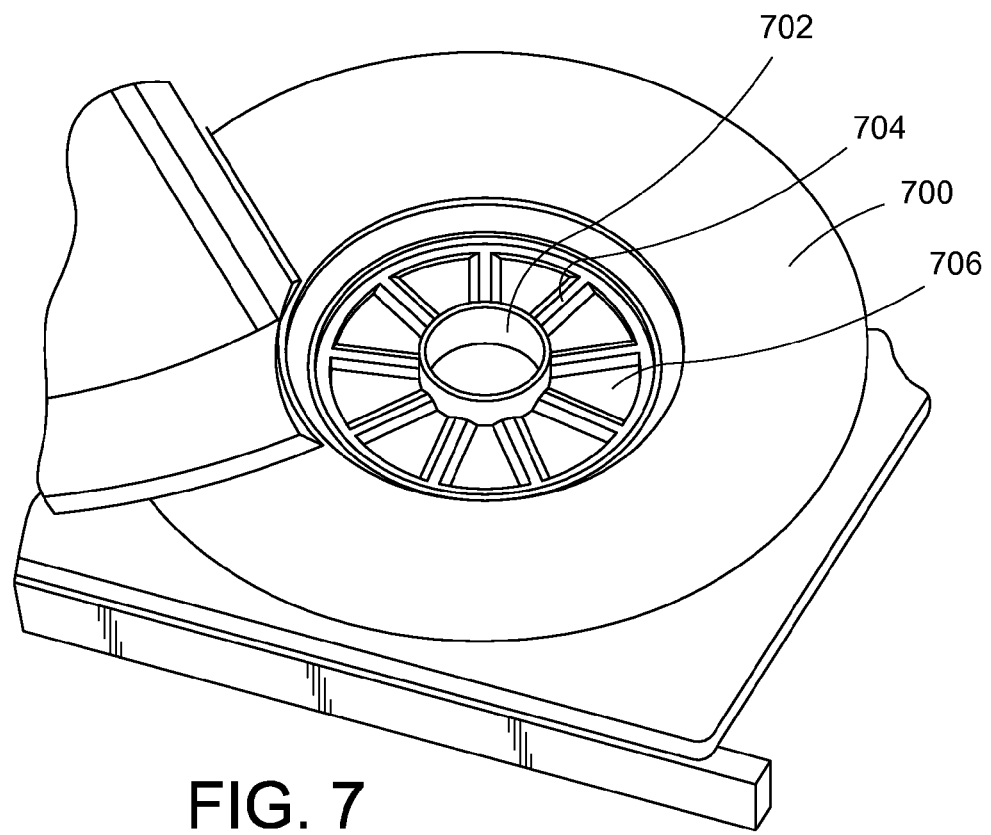

FIG. 7 provides a cross-sectional perspective of a base having ribs, according to an embodiment.

Figure 8:
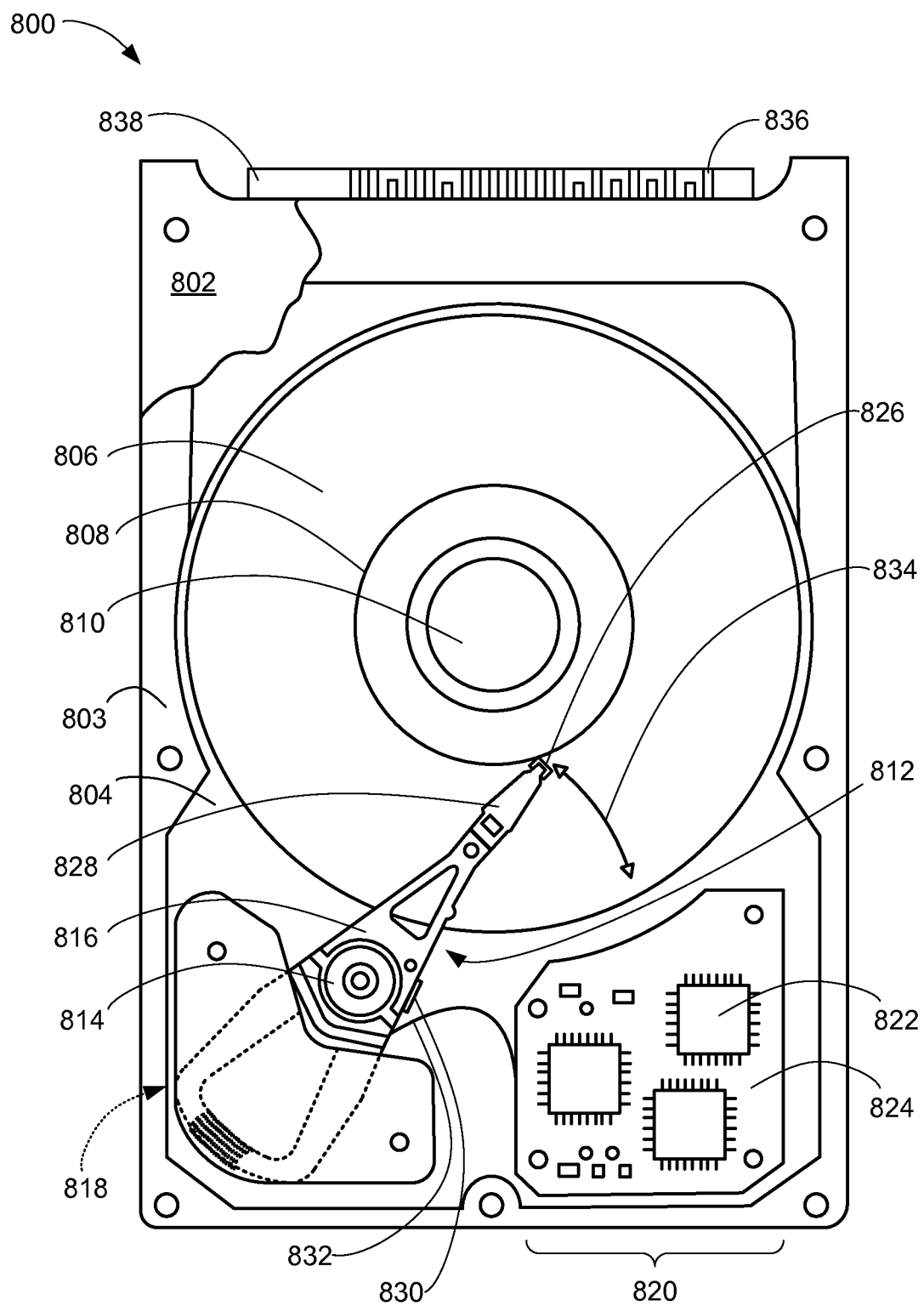

FIG. 8 provides a plan view of a conventional hard disk drive ("HDD") in which embodiments of one or more disk clamps may be used.

DESCRIPTION

Before embodiments of the invention are described in greater detail, it should be understood by persons having ordinary skill in the art to which the invention pertains that the invention is not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art to which the invention pertains that the terminology used herein is for the purpose of describing embodiments of the invention, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the claimed invention, or embodiments thereof. For example, "first," "second," and "third" elements or steps need not necessarily appear in that order, and the claimed invention, or embodiments thereof, need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the invention pertains.

Embodiments of the invention will now be described in greater detail.

Disks of a hard disk drive ("HDD"), such as that of FIG. 8 described herein below are rotated at high speeds by means of an electric motor located inside a spindle motor assembly mounted on a base of a housing assembly. Such electric motors include a stator assembly comprising a stator ring and a plurality of stator teeth extending from the stator ring. Each stator tooth of the plurality of stator teeth supports a field coil that may be energized to polarize the field coil. Such electric motors further comprise a plurality of permanent magnets disposed adjacent to the plurality of stator teeth. As the plurality of field coils disposed on the plurality of stator teeth are energized in alternating polarity, the magnetic attraction or repulsion of a field coil to an adjacent permanent magnet causes the spindle of the spindle motor assembly to rotate, thereby rotating the disks for read/write operations by one or more read-write heads.

Increasingly, electric motors, including those in smaller HDD form-factors, may have thinner structures resulting in weaker structures that affect electric motor performance. To meet certain metrics for electric motor performance, the structural integrity of such electric motors may benefit from design features that provide more space for other components as opposed to, for example, increasing the thickness of the base of the housing assembly upon which the spindle motor assembly comprising the electric motor is mounted, which would provide less space for other components. Provided herein are apparatuses for increasing the structural integrity of electric motors and/or the base upon which such electric motors are mounted without increasing the thickness of the base.

With respect to increasing structural integrity, an apparatus comprising a stator assembly support described herein below may benefit from increased strength (i.e., resistance to failure such as breakage in response to an applied force) provided by the stator assembly support in one or more regions of the apparatus. For example, a stator assembly support may confer increased strength to a housing assembly base upon which the stator assembly support is mounted. Such increased strength may protect or mitigate damage to components within the apparatus during a shock event (e.g., dropping the apparatus).

Further with respect to increasing structural integrity, an apparatus comprising a stator assembly support described herein below may benefit from increased stiffness or rigidity (i.e., resistance to deformation in response to an applied force) provided by the stator assembly support in one or more regions of the apparatus. For example, a stator assembly support may confer increased stiffness to a housing assembly base upon which the stator assembly support is mounted. Such increased stiffness may protect or mitigate damage to components within the apparatus during a shock event (e.g., dropping the apparatus).

Further with respect to increased stiffness, an apparatus comprising a stator assembly support described herein below may concomitantly benefit from increased damping (i.e., ability to reduce the amplitude of oscillations [e.g., mechanical vibrations] in an oscillatory system) provided by the stator assembly support in one or more regions of the apparatus. For example, a stator assembly support may confer increased damping (of mechanical vibrations) to a housing assembly base upon which the stator assembly support is mounted. Such increased damping may increase the performance of an electric motor housed within the apparatus.

FIG. 1A provides a cross-sectional perspective of a stator assembly and stator assembly support having a stator ring support, according to an embodiment. As shown in FIG. 1A, the stator assembly 110 and stator assembly support 120 may be positioned in a base 100 having a cylindrical structure 102 therein. Such a cylindrical structure 102 may also be referred to as a stator tower, as stator assemblies may be fixed to and supported by such cylindrical structures in the base. However, in embodiments presented herein, a stator assembly 110 such as that in FIG. 1A may be substantially decoupled from the cylindrical structure and/or positioned substantially or wholly outside the cylindrical structure 102.

With respect to the stator assembly 110 of FIG. 1A, the stator assembly 110 comprises a stator ring 112, a plurality of stator teeth 114, and a plurality of field coils 116, each of which field coils is disposed on a separate stator tooth.

With respect to the stator assembly support 120 of FIG. 1A, the stator assembly support 120 comprises a stator ring support 122, which may be positioned directly under the stator ring 112. Such a stator assembly support 120 may comprise a material such as plastic, including thermoplastic, for example, liquid crystal polymer ("LCP"); however, the stator assembly support 120 is not limited to the foregoing material. As a complement to the stator ring support 122, the base 100 may have tabs that function to support the plurality of stator teeth 114. (See FIG. 6 and the accompanying description for additional detail regarding the foregoing tabs.) In an alternative to the stator ring support 122, the stator ring support 122 may be absent in favor of a stator assembly support comprising a stator teeth support (e.g., stator teeth support 124 of FIG. 1B) or tabs in the base 100 that function to support the plurality of stator teeth 114.

In any embodiment of FIG. 1A, a bead of adhesive 101 may be used to fix the plurality of field coils 116 of the stator assembly 110 to the base 100, and adhesive may be further used to fix the stator ring support 122 (if present) to each of the stator ring 112 of the stator assembly 110 and the base 100.

FIG. 1B provides a cross-sectional perspective of a stator assembly and stator assembly support having a stator ring support and a stator teeth support, according to an embodiment. As shown in FIG. 1B, the stator assembly 110 and stator assembly support 120 may be substantially decoupled from the cylindrical structure and/or positioned in a base 100 substantially or wholly outside a cylindrical structure 102 of the base.

With respect to the stator assembly 110 of FIG. 1B, the stator assembly 110 comprises a stator ring 112, a plurality of stator teeth 114, and a plurality of field coils 116, each of which field coils is disposed on a separate stator tooth.

With respect to the stator assembly support 120 of FIG. 1B, the stator assembly support 120 comprises a stator ring support 122, which may be positioned directly under the stator ring 112, and a stator teeth support 124, which may be positioned directly under the plurality of stator teeth 114. As shown in FIG. 1B, the stator ring support 122 and the stator teeth support 124 may be of substantially equal heights. The stator ring support 122, positioned inside of the stator teeth support 124, may have a smaller diameter (e.g., inner or outer diameter) than the stator teeth support 124. As calculated from the difference between the outer diameter and the inner diameter of each of the stator ring support 122 and the stator teeth support 124, the width of the stator ring support 122 may be greater than that of the stator teeth support 124. Alternatively, as calculated from the difference between the outer diameter and the inner diameter of each of the stator teeth support 124 and the stator ring support 122, the width of the stator teeth support may be greater than that of the stator ring support 122.

In an alternative to the stator teeth support 124 of FIG. 1B, the base 100 may instead have tabs that function to support the plurality of stator teeth 114. (See FIG. 6 and the accompanying description for additional detail regarding the foregoing tabs.) As such, the stator assembly support 120 of FIG. 1B may comprise a plurality of tabs extending from the base 100, which may be positioned directly under the plurality of stator teeth 114, and a stator ring support 122, which may be positioned directly under the stator ring 112.

In any embodiment of FIG. 1B, a bead of adhesive 101 may be used to fix the plurality of field coils 116 of the stator assembly 110 to the base 100, and adhesive may be further used to fix the stator ring support 122 (if present) to each of the stator ring 112 and the base 100, and adhesive may be even further used to fix the stator teeth support 124 to each of the plurality of stator teeth 114 and the base 100.

FIG. 1C provides a perspective of a stator teeth support, according to an embodiment. The stator teeth support 124 of FIG. 1C comprises an inner perimeter 125, an outer perimeter 126, a base-facing surface (not shown), and a stator teeth-facing surface 127.

FIG. 2A provides a cross-sectional perspective of a stator assembly and stator assembly support having a stator ring support, a stator teeth support, and ribs, according to an embodiment. As shown in FIG. 2A, the stator assembly 210 and stator assembly support 220 may be substantially decoupled from the cylindrical structure and/or positioned in a base 200 substantially or wholly outside a cylindrical structure 202 of the base.

With respect to the stator assembly 210 of FIG. 2A, the stator assembly comprises a stator ring 212, a plurality of stator teeth 214, and a plurality of field coils 216, each of which field coils is disposed on a separate stator tooth.

With respect to the stator assembly support 220 of FIG. 2A, the stator assembly support 220 comprises a stator ring support 222, which may be positioned directly under the stator ring 212, a stator teeth support 224, which may be positioned directly under the plurality of stator teeth 214, and ribs 223, which connect a bottom portion of the stator ring support 222 to a bottom portion of the stator teeth support 224. Such a stator assembly support 220 may comprise a material such as plastic, including thermoplastic, for example, liquid crystal polymer ("LCP"); however, the stator assembly support 220 is not limited to the foregoing material.

FIG. 2B provides a perspective of the stator assembly support of FIG. 2A having a stator ring support, a stator teeth support, and ribs, according to an embodiment. The stator assembly support 220 of FIG. 2B comprises a stator ring support 222, a stator teeth support 224, and ribs 223 connecting a bottom portion of the stator ring support 222 to a bottom portion of the stator teeth support 224. The stator ring support 222 comprises an inner perimeter 225, an outer perimeter 226, a base-facing surface (not shown), and a stator ring-facing surface 227. Likewise, the stator teeth support 224 comprises an inner perimeter 225', an outer perimeter 226', a base-facing surface (not shown), and a stator teeth-facing surface 227'. The ribs 223 of the stator assembly support of FIG. 2B comprise a base-facing surface (not shown) and a stator assembly-facing surface 221. The field coils 216 of the stator assembly 210 may sit on or be optionally adhered to the area of the base 200 inbetween the ribs, or the field coils 216 of the stator assembly 210 may sit on or be optionally adhered to the stator assembly-facing surface 221 of the ribs 223.

As best shown in FIG. 2A, the stator ring support 222 and the stator teeth support 224 may be of substantially equal heights. Turning back to FIG. 2B, the stator ring support 222, positioned inside of the stator teeth support 224, may have a smaller diameter (e.g., inner or outer diameter) than the stator teeth support 224. As calculated from the difference between the outer diameter and the inner diameter of each of the stator ring support 222 and the stator teeth support 224, the width of the stator ring support 222 may be greater than that of the stator teeth support 224. Alternatively, as calculated from the difference between the outer diameter and the inner diameter of each of the stator teeth support 224 and the stator ring support 222, the width of the stator teeth support 224 may be greater than that of the stator ring support 222.

FIG. 2C provides a perspective of a stator assembly support having a stator ring support and ribs, according to an embodiment. Such a stator assembly support may be used as an alternative to the stator assembly support of FIG. 2B. The stator assembly support 220 of FIG. 2C comprises a stator ring support 222 and ribs 223 extending from a bottom portion of the stator ring support 222, along the base 200, to a region of the base 200 at or near an outer perimeter of the stator assembly 210, which outer perimeter is defined by the field coils 216 or the stator teeth 214 of the stator assembly 210. The stator ring support 222 of the stator assembly support of FIG. 2C comprises an inner perimeter 225, an outer perimeter 226, a base-facing surface (not shown), and a stator ring-facing surface 227. The ribs 223 of the stator assembly support of FIG. 2C comprise a base-facing surface (not shown) and a stator assembly-facing surface 221. The field coils 216 of the stator assembly 210 may sit on or be optionally adhered to the area of the base 200 inbetween the ribs, or the field coils 216 of the stator assembly 210 may sit on or be optionally adhered to the stator assembly-facing surface 221 of the ribs 223.

FIG. 2D provides a perspective of a stator assembly support having a stator teeth support and ribs, according to an embodiment. Such a stator assembly support may be used as an alternative to the stator assembly support of FIG. 2B or FIG. 2C. The stator assembly support 220 of FIG. 2D comprises a stator teeth support 224 and ribs 223 extending from a bottom portion of the stator teeth support 224, along the base 200, to a region of the base 200 at or near an inner perimeter of the stator assembly 210, which inner perimeter is defined by stator ring 212 of the stator assembly 210. The stator teeth support 224 of the stator assembly support of FIG. 2D comprises an inner perimeter 225', an outer perimeter 226', a base-facing surface (not shown), and a stator teeth-facing surface 227'. The ribs 223 of the stator assembly support of FIG. 2D comprise a base-facing surface (not shown) and a stator assembly-facing surface 221, on which the field coils 216 of the stator assembly 310 may sit or be optionally adhered to. The field coils 216 of the stator assembly 210 may sit on or be optionally adhered to the area of the base 200 inbetween the ribs, or the field coils 216 of the stator assembly 210 may sit on or be optionally adhered to the stator assembly-facing surface 221 of the ribs 223.

In an alternative to the stator teeth support 224 of FIGS. 2A and 2B, or in the absence of a stator teeth support such as in FIG. 2C, the base 200 may instead have tabs that function to support the plurality of stator teeth 214. (See FIG. 6 and the accompanying description for additional detail regarding the foregoing tabs.) As such, the stator assembly support 220 may comprise a plurality of tabs extending from the base 200, which may be positioned directly under the plurality of stator teeth 214 in some embodiments.

In an alternative to the stator assembly support 220 having ribs such as the ribs of FIG. 2A, FIG. 2B, FIG. 2C, or FIG. 2D, the base 200 may instead have ribs stamped therein that function to strengthen support of the stator assembly. (See FIG. 7 and the accompanying description for additional detail regarding the foregoing stamped ribs.) The field coils 216 of the stator assembly 210 may sit in or be optionally adhered to the area of the base 200 inbetween the ribs, or the field coils 216 of the stator assembly 210 may sit on or be optionally adhered to the ribs of base 200.

In any embodiment described in relation to FIG. 2A, FIG. 2B, FIG. 2C, or FIG. 2D, a bead of adhesive 201 may be used to fix the plurality of field coils 216 of the stator assembly 210, and adhesive may be further used to fix the stator ring support 222 (if present) to each of the stator ring 212 and the base 200, and adhesive may be even further used to fix the stator teeth support 224 (if present) to each of the plurality of stator teeth 214 and the base 200. In fixing the field coils 216 of the stator assembly support 220, the field coils 216 may be adhered to the area of the base 200 inbetween the ribs 223 of the stator assembly support 220, or the field coils 216 of the stator assembly support 220 may be optionally adhered to the ribs 223 of the stator assembly support 220.

FIG. 3A provides a cross-sectional perspective of a stator assembly and stator assembly support having a stator ring support, a stator teeth support, and a full bottom, according to an embodiment. As shown in FIG. 3A, the stator assembly 310 and stator assembly support 320 may be substantially decoupled from the cylindrical structure and/or positioned in a base 300 substantially or wholly outside a cylindrical structure 302 of the base.

With respect to the stator assembly 310 of FIG. 2A, the stator assembly comprises a stator ring 312, a plurality of stator teeth 314, and a plurality of field coils 316, each of which field coils is disposed on a separate stator tooth.

With respect to the stator assembly support 320 of FIG. 2A, the stator assembly support 320 comprises a stator ring support 322, which may be positioned directly under the stator ring 312, a stator teeth support 324, which may be positioned directly under the plurality of stator teeth 314, and full bottom 323, which connects a bottom portion of the stator ring support 322 to a bottom portion of the stator teeth support 324. Such a stator assembly support 320 may comprise a material such as plastic, including thermoplastic, for example, liquid crystal polymer ("LCP"); however, the stator assembly support 320 is not limited to the foregoing material.

FIG. 3B provides a perspective of a stator assembly support of FIG. 3A having a stator ring support, a stator teeth support, and a full bottom, according to an embodiment. The stator assembly support 320 of FIG. 3B comprises a stator ring support 322, a stator teeth support 324, and full bottom 323 connecting a bottom portion of the stator ring support 322 to a bottom portion of the stator teeth support 324. The stator ring support 322 comprises an inner perimeter 325, an outer perimeter 326, a base-facing surface (not shown), and a stator ring-facing surface 327. Likewise, the stator teeth support 324 comprises an inner perimeter 325', an outer perimeter 326', a base-facing surface (not shown), and a stator teeth-facing surface 327'. The full bottom 323 of the stator assembly support of FIG. 3B comprises a base-facing surface (not shown) and a stator assembly-facing surface 321. The field coils 316 of the stator assembly 310 may sit on or be optionally adhered to the stator assembly-facing surface 321 of the full bottom 323.

As best shown in FIG. 3A, the stator ring support 322 and the stator teeth support 324 may be of substantially equal heights. Turning back to FIG. 3B, the stator ring support 322, positioned inside of the stator teeth support 324, may have a smaller diameter (e.g., inner or outer diameter) than the stator teeth support 324. As calculated from the difference between the outer diameter and the inner diameter of each of the stator ring support 322 and the stator teeth support 324, the width of the stator ring support 322 may be greater than that of the stator teeth support 324. Alternatively, as calculated from the difference between the outer diameter and the inner diameter of each of the stator teeth support 324 and the stator ring support 322, the width of the stator teeth support 324 may be greater than that of the stator ring support 322.

FIG. 3C provides a perspective of a stator assembly support having a stator ring support and a full bottom, according to an embodiment. Such a stator assembly support may be used as an alternative to the stator assembly support of FIG. 3B. The stator assembly support 320 of FIG. 3C comprises a stator ring support 322 and a full bottom 323 extending from a bottom portion of the stator ring support 322, along the base 300, to a region of the base 300 at or near an outer perimeter of the stator assembly 310, which outer perimeter is defined by the field coils 316 or the stator teeth 314 of the stator assembly 310. The stator ring support 322 of the stator assembly support of FIG. 3C comprises an inner perimeter 325, an outer perimeter 326, a base-facing surface (not shown), and a stator ring-facing surface 327. The full bottom 323 of the stator assembly support of FIG. 3C comprises a base-facing surface (not shown) and a stator assembly-facing surface 321, on which the field coils 316 of the stator assembly 310 may sit or be optionally adhered to.

FIG. 3D provides a perspective of a stator assembly support having a stator teeth support and a full bottom, according to an embodiment. Such a stator assembly support may be used as an alternative to the stator assembly support of FIG. 3B or FIG. 3C. The stator assembly support 320 of FIG. 3D comprises a stator teeth support 324 and a full bottom 323 extending from a bottom portion of the stator teeth support 324, along the base 300, to a region of the base 300 at or near an inner perimeter of the stator assembly 310, which inner perimeter is defined by stator ring 312 of the stator assembly 310. The stator teeth support 324 of the stator assembly support of FIG. 3D comprises an inner perimeter 325', an outer perimeter 326', a base-facing surface (not shown), and a stator teeth-facing surface 327'. The full bottom 323 of the stator assembly support of FIG. 3D comprises a base-facing surface (not shown) and a stator assembly-facing surface 321, on which the field coils 316 of the stator assembly 310 may sit or be optionally adhered to.

In an alternative to the stator teeth support 324 of FIGS. 3A and 3B, or in the absence of a stator teeth support such as in FIG. 3C, the base 300 may instead have tabs that function to support the plurality of stator teeth 314. (See FIG. 6 and the accompanying description for additional detail regarding the foregoing tabs.) As such, the stator assembly support 320 may comprise a plurality of tabs extending from the base 300, which may be positioned directly under the plurality of stator teeth 314 in some embodiments.

In any embodiment described in relation to FIG. 3A, FIG. 3B, FIG. 3C, or FIG. 3D, a bead of adhesive 301 may be used to fix the plurality of field coils 316 of the stator assembly 310, and adhesive may be further used to fix the stator ring support 322 (if present) to each of the stator ring 312 and the base 300, and adhesive may be even further used to fix the stator teeth support 324 (if present) to each of the plurality of stator teeth 314 and the base 300. In fixing the field coils 316 of the stator assembly support 320, the field coils 316 may be adhered to the full bottom 323 of the stator assembly support 320.

FIG. 4A and FIG. 4B provide cross-sectional perspectives of stator assemblies and partially molded stator assembly supports, according to some embodiments. As shown in each of FIG. 4A and FIG. 4B, the stator assembly 410 and stator assembly support 420 may be substantially decoupled from the cylindrical structure and/or positioned in a base 400 substantially or wholly outside a cylindrical structure 402 of the base 400.

With respect to the stator assembly 410 of each of FIG. 4A and FIG. 4B, the stator assembly comprises a stator ring 412, a plurality of stator teeth 414, and a plurality of field coils 416, each of which field coils is disposed on a separate stator tooth.

With respect to the partially molded stator assembly support 420 of each of FIG. 4A and FIG. 4B, the stator assembly support 420 comprises a stator ring support 422 (e.g., the portion of the partially molded stator assembly support 420 directly under the stator ring 412), a stator teeth support 424 (e.g., the portion of the partially molded stator assembly support 420 directly under the stator teeth 414), and a bottom 423 (e.g., the portion of the partially molded stator assembly support 420 directly under the plurality of field coils 416), which connects a bottom portion of the stator ring support 322 to a bottom portion of the stator teeth support 324. Such a stator assembly support 420 may comprise a material such as plastic, including thermoplastic, for example, liquid crystal polymer ("LCP"); however, the stator assembly support 420 is not limited to the foregoing material. While the stator ring 412 and the plurality of stator teeth 414 of the stator assembly 420 may be completely encased in the stator assembly support 420 as shown in each of FIG. 4A and FIG. 4B, the top surface of the stator ring 412, the inner perimeter of the stator ring 412, the top surfaces of the plurality of stator teeth 414, and/or the outer perimeter of the plurality of stator teeth 414 may be exposed in some embodiments. As further shown in each of FIG. 4A and FIG. 4B, the plurality of field coils 416 at or above the top surface of the stator ring and/or at or above the top surfaces of the plurality of stator teeth 414 may be exposed (i.e., not encased in the partially molded stator assembly support 420).

Turning to FIG. 4B, the partially molded stator assembly support 420 may further comprise a centering feature or protrusion 428 for centering the stator assembly 410/partially molded stator assembly support 420 in the base 400 around the cylindrical structure 402. Such a centering feature 428 may extend from a bottom portion of the stator ring support 422, along the base 400, to a region of the base 400 at or near the cylindrical structure 402. As shown in FIG. 4B, the height of the centering feature 428 may be less than the height of the bottommost lamination of the stator ring 412; however, the height of the centering feature 428 may be more or less than that shown in FIG. 4B. In some embodiments, for example, the height of the centering feature 428 may be substantially equivalent to the height of the topmost lamination of the stator ring 412, the cylindrical structure 402, the bottommost lamination of the stator ring 412, or the bottom 423 of the stator assembly support 420.

In any embodiment described in relation to FIG. 4A or FIG. 4B, an adhesive may be used to fix the partially molded stator assembly support 420 to the base 400. In fixing the partially molded stator assembly support 420 to the base 400, an adhesive may be further used to fix an inner diameter of the centering feature 428 to the cylindrical structure 402 of the base 400.

FIG. 5A and FIG. 5B provide cross-sectional perspectives of stator assemblies and fully molded stator assembly supports, according to some embodiments. As shown in each of FIG. 5A and FIG. 5B, the stator assembly 510 and stator assembly support 520 may be substantially decoupled from the cylindrical structure and/or positioned in a base 500 substantially or wholly outside a cylindrical structure 502 of the base 500.

With respect to the stator assembly 510 of each of FIG. 5A and FIG. 5B, the stator assembly comprises a stator ring 512, a plurality of stator teeth 514, and a plurality of field coils 516, each of which field coils is disposed on a separate stator tooth.

With respect to the fully molded stator assembly support 520 of each of FIG. 5A and FIG. 5B, the stator assembly support 520 comprises a stator ring support 522 (e.g., the portion of the partially molded stator assembly support 520 directly under the stator ring 512), a stator teeth support 524 (e.g., the portion of the partially molded stator assembly support 520 directly under the stator teeth 514), and a bottom 523 (e.g., the portion of the partially molded stator assembly support 520 directly under the plurality of field coils 516), which connects a bottom portion of the stator ring support 522 to a bottom portion of the stator teeth support 524. Such a stator assembly support 520 may comprise a material such as plastic, including thermoplastic, for example, liquid crystal polymer ("LCP"); however, the stator assembly support 520 is not limited to the foregoing material. While the stator ring 512 and the plurality of stator teeth 514 of the stator assembly 520 may be completely encased in the stator assembly support 520 as shown in each of FIG. 5A and FIG. 5B, the inner perimeter of the stator ring 512 and/or the outer perimeter of the plurality of stator teeth 514 may be exposed in some embodiments. As further shown in each of FIG. 5A and FIG. 5B, the plurality of field coils 516 may be completely encased in the fully molded stator assembly support 520).

Turning to FIG. 5B, the fully molded stator assembly support 520 may further comprise a centering feature or protrusion 528 for centering the stator assembly 510/fully molded stator assembly support 520 in the base 500 around the cylindrical structure 502. Such a centering feature 528 may extend from a bottom portion of the stator ring support 522, along the base 500, to a region of the base 500 at or near the cylindrical structure 502. As shown in FIG. 5B, the height of the centering feature 528 may be less than the height of the bottommost lamination of the stator ring 512; however, the height of the centering feature 528 may be more or less than that shown in FIG. 5B. In some embodiments, for example, the height of the centering feature 528 may be substantially equivalent to the height of the plurality of field coils 516, the topmost lamination of the stator ring 512, the cylindrical structure 502, the bottommost lamination of the stator ring 512, or the bottom 523 of the stator assembly support 520.

In any embodiment described in relation to FIG. 5A or FIG. 5B, an adhesive may be used to fix the fully molded stator assembly support 520 to the base 500. In fixing the fully molded stator assembly support 520 to the base 500, an adhesive may be further used to fix an inner diameter of the centering feature 528 to the cylindrical structure 502 of the base 500.

FIG. 6 provides a cross-sectional perspective of a base having tabs, according to an embodiment. As disclosed herein above, in some embodiments, a stator assembly or a stator assembly and stator assembly support not having a stator teeth support may be positioned in a base 600 having a cylindrical structure 602, a plurality of tabs 604 extending from the base at a 90° angle to the base, concentrically arranged by their long edges around the cylindrical structure 602, and a plurality of tab voids 606 therein. The stator assembly or the stator assembly and stator assembly support not having a stator teeth support may be substantially decoupled from the cylindrical structure and/or positioned in the base 600 substantially or wholly outside the cylindrical structure 602 of the base such that the plurality of tabs 604 are directly under, and optionally adhered to, the plurality of stator teeth. The stator assembly or the stator assembly and stator assembly support not having a stator teeth support may be further positioned in the base 600 such that each field coil of the plurality of field coils separately occupies a tab void of the plurality of tab voids 606.

The plurality of tabs 604 may be formed directly from the base 600. In such embodiments, each tab of the plurality of tabs 604 may be formed by cutting out from the base 600 three consecutive sides of a tab, bending the tab up from the base along the uncut side of the tab such that the tab extends from the base at a 90° angle, and further machining the tab to meet the specification of the stator assembly or the stator assembly and stator assembly support to be supported.

The plurality of tabs 604 may be formed from material from the base 600. In such embodiments, each tab of the plurality of tabs 604 may be formed by completely cutting out material from the base 600 for a tab, machining the material into the tab, attaching (e.g., by interference fit; adhesive; fastener; etc.) the tab to the base such that the tab extends from the base at a 90° angle, and further machining the tab to meet the specification of the stator assembly or the stator assembly and stator assembly support to be supported.

The plurality of tabs 604 may be formed from material not originating from the base 600. In such embodiments, each tab of the plurality of tabs 604 may be formed by cutting material for a tab, which material may be the same material or a different material as the base 600, machining the material into the tab, attaching (e.g., by interference fit; adhesive; fastener; etc.) the tab to the base such that the tab extends from the base at a 90° angle, and further machining the tab to meet the specification of the stator assembly or the stator assembly and stator assembly support to be supported.

FIG. 7 provides a cross-sectional perspective of a base having ribs, according to an embodiment. As disclosed herein above, in some embodiments, a stator assembly or a stator assembly and stator assembly support may be positioned in a base 700 having a cylindrical structure 702, a plurality of ribs 704 extending like rays from a region at or near the cylindrical structure 702 to a region at or near an outer perimeter of the stator assembly to be supported, and a plurality of pie-shaped depressions 706 alternating with the plurality of ribs. The stator assembly or the stator assembly and stator assembly support may be substantially decoupled from the cylindrical structure and/or positioned in the base 700 substantially or wholly outside the cylindrical structure 702 of the base such that the plurality of pie-shaped depressions 706 are directly under, and optionally adhered to, the plurality of field coils or the plurality of ribs 704 are directly under, and optionally adhered to, the plurality of field coils.

The plurality of ribs 704 and pie-shaped depressions 706 may be formed directly from the base 700. In such embodiments, the plurality of ribs 704 and pie-shaped depressions 706 may be stamped into the base 700 when the base itself is stamped from its parent material.

FIG. 8 provides a plan view of a hard disk drive 800, which hard disk drive may use the a disk clamp described herein. Hard disk drive 800 may include a housing assembly comprising a cover 802 that mates with a base deck having a frame 803 and a floor 804, which housing assembly provides a protective space for various hard disk drive components. The hard disk drive 800 includes one or more data storage disks 806 of computer-readable data storage media. Typically, both of the major surfaces of each data storage disk 806 include a plurality of concentrically disposed tracks for data storage purposes. Each data storage disk 806 is mounted on a hub 808, which in turn is rotatably interconnected with the base deck and/or cover 802. Multiple data storage disks 806 are typically mounted in vertically spaced and parallel relation on the hub 808. A spindle motor assembly 810 rotates the data storage disks 806.

The hard disk drive 800 also includes an actuator arm assembly 812 that pivots about a pivot bearing 814, which in turn is rotatably supported by the base deck and/or cover 802. The actuator arm assembly 812 includes one or more individual rigid actuator arms 816 that extend out from near the pivot bearing 814. Multiple actuator arms 816 are typically disposed in vertically spaced relation, with one actuator arm 816 being provided for each major data storage surface of each data storage disk 806 of the hard disk drive 800. Other types of actuator arm assembly configurations could be utilized as well, an example being an "E" block having one or more rigid actuator arm tips, or the like, that cantilever from a common structure. Movement of the actuator arm assembly 812 is provided by an actuator arm drive assembly, such as a voice coil motor 818 or the like. The voice coil motor 818 is a magnetic assembly that controls the operation of the actuator arm assembly 812 under the direction of control electronics 820. The control electronics 820 may include a plurality of integrated circuits 822 coupled to a printed circuit board 824. The control electronics 820 may be coupled to the voice coil motor assembly 818, a slider 826, or the spindle motor assembly 810 using interconnects that can include pins, cables, or wires (not shown).

A load beam or suspension 828 is attached to the free end of each actuator arm 816 and cantilevers therefrom. Typically, the suspension 828 is biased generally toward its corresponding data storage disk 806 by a spring-like force. The slider 826 is disposed at or near the free end of each suspension 828. What is commonly referred to as the read-write head (e.g., transducer) is appropriately mounted as a head unit (not shown) under the slider 826 and is used in hard disk drive read/write operations. The head unit under the slider 826 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 826 is connected to a preamplifier 830, which is interconnected with the control electronics 820 of the hard disk drive 800 by a flex cable 832 that is typically mounted on the actuator arm assembly 812. Signals are exchanged between the head unit and its corresponding data storage disk 806 for hard disk drive read/write operations. In this regard, the voice coil motor 818 is utilized to pivot the actuator arm assembly 812 to simultaneously move the slider 826 along a path 834 and across the corresponding data storage disk 806 to position the head unit at the appropriate position on the data storage disk 806 for hard disk drive read/write operations.

When the hard disk drive 800 is not in operation, the actuator arm assembly 812 is pivoted to a "parked position" to dispose each slider 826 generally at or beyond a perimeter of its corresponding data storage disk 806, but in any case in vertically spaced relation to its corresponding data storage disk 806. In this regard, the hard disk drive 800 includes a ramp assembly (not shown) that is disposed beyond a perimeter of the data storage disk 806 to both move the corresponding slider 826 vertically away from its corresponding data storage disk 806 and to also exert somewhat of a retaining force on the actuator arm assembly 812.

Exposed contacts 836 of a drive connector 838 along a side end of the hard disk drive 800 may be used to provide connectivity between circuitry of the hard disk drive 800 and a next level of integration such as an interposer, a circuit board, a cable connector, or an electronic assembly. The drive connector 838 may include jumpers (not shown) or switches (not shown) that may be used to configure the hard disk drive 800 for user specific features or configurations. The jumpers or switches may be recessed and exposed from within the drive connector 838.

As such, provided herein is an apparatus, comprising a base comprising a cylindrical structure extending from the base; a stator assembly comprising a stator ring, a plurality of stator teeth extending from an outer diameter of the stator ring, and a plurality of field coils singly disposed on the plurality of stator teeth; and a stator assembly support comprising a supporting feature configured to support at least one of the stator ring or the plurality of stator teeth, wherein the stator assembly support is coupled with the base and substantially decoupled from the cylindrical structure. In some embodiments, the supporting feature is configured to support each of the stator ring and the plurality of stator teeth, and wherein the stator assembly support further comprises a bottom support connecting a bottom portion of a stator ring support to a bottom portion of a stator teeth support. In some embodiments, the bottom support comprises a plurality of ribs connecting the bottom portion of the stator ring support to the bottom portion of the stator teeth support. In some embodiments, the plurality of field coils are singly positioned inbetween the plurality of ribs. In some embodiments, the bottom support comprises an annulus connecting the bottom portion of the stator ring support to the bottom portion of the stator teeth support. In some embodiments, the plurality of field coils are positioned on the annulus. In some embodiments, the supporting feature is at least partially molded around the stator assembly. In some embodiments, the supporting feature is completely molded around the stator assembly. In some embodiments, the stator assembly support further comprises a protrusion for centering the stator assembly support in the base around the cylindrical structure.

Also provided is an apparatus, comprising a base comprising a cylindrical structure extending from the base; a stator assembly comprising a stator ring, a plurality of stator teeth extending from an outer diameter of the stator ring, and a plurality of field coils singly disposed on the plurality of stator teeth; and a stator assembly support comprising a stator ring support, a stator teeth support, and a bottom support connecting a bottom portion of the stator ring support to a bottom portion of the stator teeth support, wherein the stator assembly support is fixed in the base substantially outside the cylindrical structure. In some embodiments, the bottom support comprises a plurality of ribs connecting the bottom of the stator ring support and the bottom of the stator teeth support, and wherein the plurality of field coils are singly positioned inbetween the plurality of ribs. In some embodiments, the bottom support comprises an annulus connecting the bottom of the stator ring support and the bottom of the stator teeth support, and wherein the plurality of field coils are positioned on the annulus. In some embodiments, the stator assembly support is at least partially molded around the stator assembly. In some embodiments, the stator assembly support is completely molded around the stator assembly.

Also provided is an apparatus, comprising a cylindrical structure extending from a base; a stator assembly comprising a stator ring and a plurality of stator teeth extending from an outer diameter of the stator ring; and a stator assembly support comprising a supporting means for supporting at least one of the stator ring or the plurality of stator teeth, wherein the stator assembly support is configured to dampen mechanical vibrations in the base. In some embodiments, the supporting means is configured to support each of the stator ring and the plurality of stator teeth, and wherein the stator assembly support further comprises a plurality of ribs connecting a bottom portion of a stator ring support to a bottom portion of a stator teeth support. In some embodiments, the supporting means is configured to support each of the stator ring and the plurality of stator teeth, and wherein the stator assembly support further comprises an annulus connecting a bottom portion of a stator ring support to a bottom portion of a stator teeth support. In some embodiments, the supporting means is at least partially molded around the stator assembly. In some embodiments, the supporting means is completely molded around the stator assembly. In some embodiments, the stator assembly support further comprises a protrusion for centering the stator assembly support in the base around the cylindrical structure.

While the invention has been described and/or illustrated by means of various embodiments and/or examples, and while these embodiments and/or examples have been described in considerable detail, it is not the intention of the applicant(s) to restrict or in any way limit the scope of the invention to such detail. Additional adaptations and/or modifications of embodiments of the invention may readily appear to persons having ordinary skill in the art to which the invention pertains, and, in its broader aspects, the invention may encompass these adaptations and/or modifications. Accordingly, departures may be made from the foregoing embodiments and/or examples without departing from the scope of the invention, which scope is limited only by the following claims when appropriately construed.

What is claimed is:

1. An apparatus, comprising:
    a base comprising a cylindrical structure extending from the base;
    a stator assembly comprising
        a stator ring,
        a plurality of stator teeth extending from an outer diameter of the stator ring, and
        a plurality of field coils singly disposed on the plurality of stator teeth; and
    a stator assembly support comprising
        a supporting feature configured to support at least one of the stator ring or the plurality of stator teeth,
            wherein the supporting feature is at least partially molded around the stator assembly, and
        a protrusion for centering the stator assembly support in the base around the cylindrical structure,
        wherein the stator assembly support is coupled with the base and substantially decoupled from the cylindrical structure.

2. The apparatus of claim 1,
    wherein the supporting feature is configured to support each of the stator ring and the plurality of stator teeth, and
    wherein the stator assembly support further comprises a bottom support connecting a bottom portion of a stator ring support to a bottom portion of a stator teeth support.

3. The apparatus of claim 2,
    wherein the bottom support comprises a plurality of ribs connecting the bottom portion of the stator ring support to the bottom portion of the stator teeth support.

4. The apparatus of claim 3,
    wherein the plurality of field coils are singly positioned inbetween the plurality of ribs.

5. The apparatus of claim 2,
wherein the bottom support comprises an annulus connecting the bottom portion of the stator ring support to the bottom portion of the stator teeth support.

6. The apparatus of claim 5,
wherein the plurality of field coils are positioned on the annulus.

7. The apparatus of claim 1,
wherein the supporting feature is completely molded around the stator assembly.

8. An apparatus, comprising:
a base comprising a cylindrical structure extending from the base;
a stator assembly encircling the cylindrical structure comprising
   a stator ring,
   a plurality of stator teeth extending from an outer diameter of the stator ring, and
   a plurality of field coils singly disposed on the plurality of stator teeth; and
a stator assembly support comprising
   a stator ring support,
   a stator teeth support,
   a bottom support connecting a bottom portion of the stator ring support to a bottom portion of the stator teeth support, and
   a protrusion for centering the stator assembly support in the base around the cylindrical structure,
   wherein the stator assembly support is fixed in the base substantially outside the cylindrical structure.

9. The apparatus of claim 8,
wherein the bottom support comprises a plurality of ribs connecting the bottom of the stator ring support and the bottom of the stator teeth support, and
wherein the plurality of field coils are singly positioned inbetween the plurality of ribs.

10. The apparatus of claim 8,
wherein the bottom support comprises an annulus connecting the bottom of the stator ring support and the bottom of the stator teeth support, and
wherein the plurality of field coils are positioned on the annulus.

11. The apparatus of claim 8,
wherein the stator assembly support is at least partially molded around the stator assembly.

12. The apparatus of claim 8,
wherein the stator assembly support is completely molded around the stator assembly.

13. An apparatus, comprising:
a cylindrical structure extending from a base;
a stator assembly comprising
   a stator ring and
   a plurality of stator teeth extending from an outer diameter of the stator ring; and
a stator assembly support comprising
   a supporting means for supporting at least one of the stator ring or the plurality of stator teeth, and
   a protrusion for centering the stator assembly support in the base around the cylindrical structure,
   wherein the stator assembly support is configured to dampen mechanical vibrations in the base.

14. The apparatus of claim 13,
wherein the supporting means is configured to support each of the stator ring and the plurality of stator teeth, and
wherein the stator assembly support further comprises a plurality of ribs connecting a bottom portion of a stator ring support to a bottom portion of a stator teeth support.

15. The apparatus of claim 13,
wherein the supporting means is configured to support each of the stator ring and the plurality of stator teeth, and
wherein the stator assembly support further comprises an annulus connecting a bottom portion of a stator ring support to a bottom portion of a stator teeth support.

16. The apparatus of claim 13,
wherein the supporting means is at least partially molded around the stator assembly.

17. The apparatus of claim 13,
wherein the supporting means is completely molded around the stator assembly.

\* \* \* \* \*